United States Patent
Takahashi et al.

(10) Patent No.: US 9,755,539 B2
(45) Date of Patent: Sep. 5, 2017

(54) AC/DC/AC CONVERSION DEVICE WITH REDUCED SWITCHING NOISE

(71) Applicant: Panasonic Intellectual Property Management Co., Ltd., Osaka (JP)

(72) Inventors: Eiji Takahashi, Nara (JP); Kazuyuki Sakiyama, Osaka (JP)

(73) Assignee: PANASONIC INTELLECTUAL PROPERTY MANGEMENT CO., LTD., Osaka (JP)

( * ) Notice: Subject to any disclaimer, the term of this patent is extended or adjusted under 35 U.S.C. 154(b) by 0 days.

(21) Appl. No.: 15/156,308

(22) Filed: May 16, 2016

(65) Prior Publication Data

US 2016/0352241 A1 Dec. 1, 2016

(30) Foreign Application Priority Data

May 25, 2015 (JP) .................. 2015-105524

(51) Int. Cl.
*H02M 5/458* (2006.01)
*H02M 1/12* (2006.01)
*H02P 27/06* (2006.01)

(52) U.S. Cl.
CPC .......... *H02M 5/458* (2013.01); *H02M 1/12* (2013.01); *H02P 27/06* (2013.01)

(58) Field of Classification Search
CPC ... H02M 1/12; H02M 2001/123; H02M 5/458
USPC ............... 363/34, 37, 39, 40, 95, 98
See application file for complete search history.

(56) References Cited

U.S. PATENT DOCUMENTS

| | | | | |
|---|---|---|---|---|
| 5,504,667 A * | 4/1996 | Tanaka | ............... | H02M 5/4505 363/37 |
| 5,608,301 A * | 3/1997 | Inaniwa | ............... | H02M 5/4585 318/376 |
| 5,731,681 A * | 3/1998 | Inaniwa | ............... | H02M 5/4585 318/376 |
| 5,793,623 A * | 8/1998 | Kawashima | ........ | H02M 1/4225 363/36 |
| 8,045,345 B2 * | 10/2011 | Kono | ............... | H02M 7/48 363/34 |
| 2016/0352241 A1* | 12/2016 | Takahashi | ............. | H02M 5/458 |

FOREIGN PATENT DOCUMENTS

| | | |
|---|---|---|
| EP | 2955839 | 12/2015 |
| JP | 10-107571 | 4/1998 |
| JP | 2010-017042 | 1/2010 |
| JP | 2014-155343 | 8/2014 |

* cited by examiner

*Primary Examiner* — Jeffrey Sterrett
(74) *Attorney, Agent, or Firm* — McDermott Will & Emery LLP

(57) ABSTRACT

A power conversion device includes a first detection circuit that acquires input information about an AC voltage and/or an alternating current which are inputted to the power conversion device from an AC power supply, a rectifier circuit, an inverter circuit including a switch, and a control circuit that generates a pulse signal for the switch while the control circuit (A) determines, based on the input information, whether the rectifier circuit is in a state in which the rectifier circuit allows switching noise to propagate from the switch to the AC power supply and (B) changes a frequency of the pulse signal with time at least in a period in which the rectifier circuit is in the state.

15 Claims, 5 Drawing Sheets

AC/DC/AC CONVERSION DEVICE WITH REDUCED SWITCHING NOISE

BACKGROUND

1. Technical Field

The present disclosure relates to a power conversion device including an inverter circuit.

2. Description of the Related Art

Japanese Unexamined Patent Application Publication No. 10-107571 discloses a circuit in which a filter is disposed between a commercial alternating-current (AC) power supply and an inverter in order to suppress the propagation of switching noise to the AC power supply.

Japanese Unexamined Patent Application Publication No. 2010-17042 discloses a technology that operates a switching circuit on the basis of a switching pattern using spread spectrum. Thus, switching noise is dispersed, and the peak value of the measured noise is reduced.

SUMMARY

A power conversion device according to an aspect of the present disclosure includes: a first detection circuit that acquires input information about at least one of an input alternating-current voltage and an input alternating current which are inputted to the power conversion device from an alternating-current power supply; a rectifier circuit that rectifies the input alternating-current voltage to output a pulsating direct-current voltage; an inverter circuit that converts the pulsating direct-current voltage into an alternating-current voltage, the inverter circuit including a switch; and a control circuit that generates a pulse signal for the switch while the control circuit (A) determines, based on the input information, whether the rectifier circuit is in a state in which the rectifier circuit allows switching noise to propagate from the switch to the alternating-current power supply and (B) changes a frequency of the pulse signal with time at least in a period in which the rectifier circuit is in the state.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Underlying Knowledge Forming Basis of the Present Disclosure

A power conversion device includes a switching circuit including switches. In the switching circuit, on/off of the switches are turned responsive to the application of pulse signals, thereby generating a voltage or current indicating the desired waveform. Examples of a switching circuit used in a power conversion device include a chopper circuit and an inverter circuit. One of pulse signals inputted to a switching circuit is a pulse-width modulation (PWM) signal. A PWM signal is generated by changing the time ratio of a square wave having a certain fundamental frequency.

When such a switching circuit performs a switching operation, switching noise is generated. Disadvantageously, the switching noise is propagated to a commercial AC power supply and then affects other electrical devices connected to the commercial AC power supply. For this reason, there is a strong demand to suppress switching noise, and standards define the measurement method and limit value of switching noise generated by switching circuits.

Figure 4:
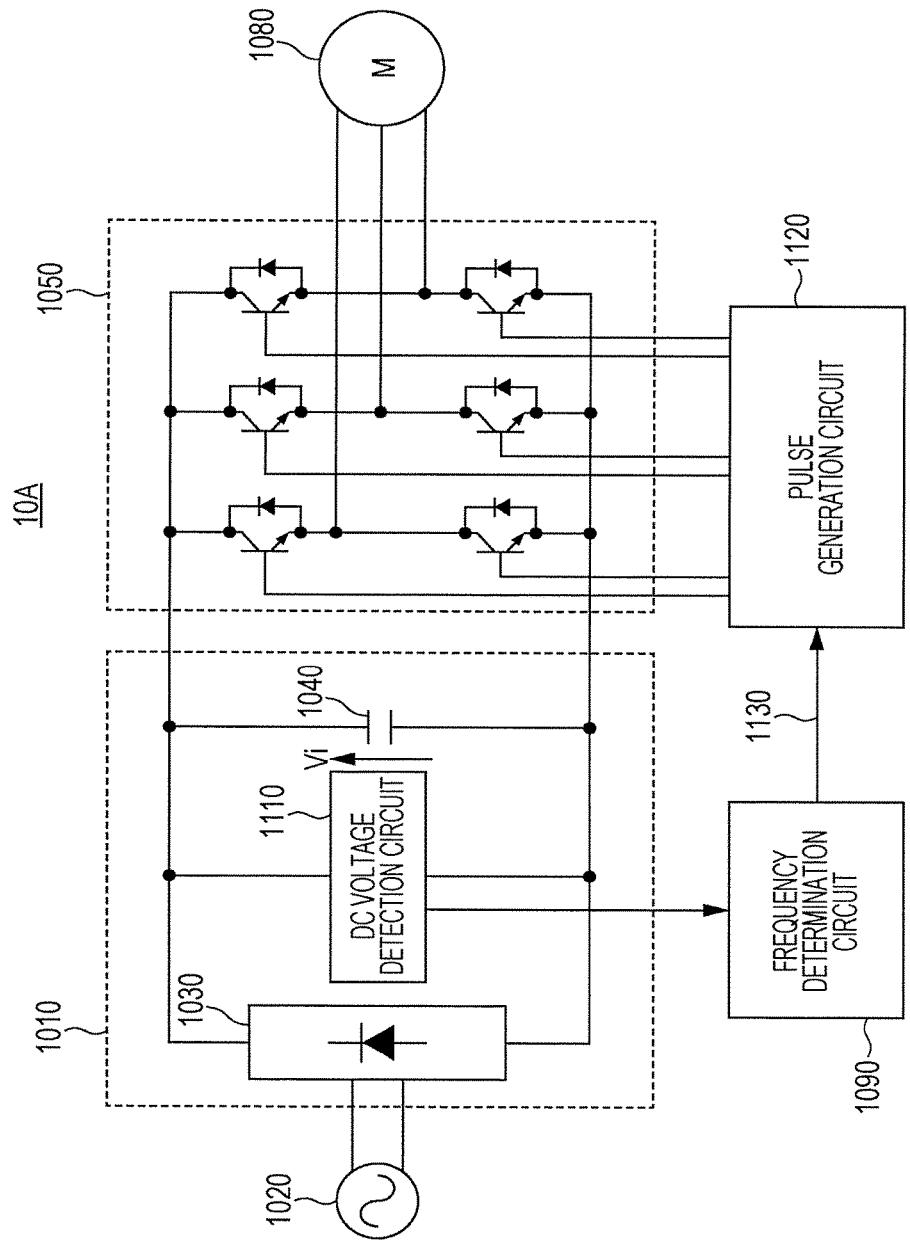
FIG. 4 is a circuit diagram of a power conversion device of a reference example.

FIG. 4 is a circuit diagram of a power conversion device 10A of a reference example. The power conversion device 10A includes a rectifier circuit 1010, an inverter circuit 1050, a frequency determination circuit 1090, and a pulse generation circuit 1120. The rectifier circuit 1010 includes a diode bridge 1030, a smoothing capacitor 1040, and a DC voltage detection circuit 1110. The diode bridge 1030 rectifies an AC voltage received from a commercial AC power supply 1020. The smoothing capacitor 1040 smoothes the voltage rectified by the diode bridge 1030. The DC voltage detection circuit 1110 detects a pulsating DC voltage Vi obtained from the smoothing capacitor 1040. The inverter circuit 1050, a three-phase inverter, is controlled by PWM signals generated by the pulse generation circuit 1120 so as to drive a motor 1080.

The frequency determination circuit 1090 generates a frequency signal 1130 and then outputs it to the pulse generation circuit 1120. The frequency signal 1130 makes the frequency of PWM signals increase in accordance with an increase in the DC voltage Vi which is detected by the DC voltage detection circuit 1110.

The pulse generation circuit 1120 generates PWM signals with a frequency specified by the frequency signal 1130 and then inputs them to switches in the inverter circuit 1050.

The frequency control of PWM signals in accordance with the DC voltage Vi causes the spectra of the PWM signals to be spread, thereby reducing a noise peak which is propagated to the commercial AC power supply 1020.

Spread spectrum is a technique that changes the fundamental frequency of a PWM signal with time. When an inverter circuit is used for driving a motor, for example, the fundamental frequency of PWM signals should not decrease to a predetermined frequency or less, in order to maintain the drive characteristics of the motor. In such a case, the fundamental frequency of PWM signals is required to increase in order to ensure the spread spectrum.

While a current passes through the switch according to the load, a potential difference occurs in the switch. The current and the potential difference causes a loss. When the switch is in on state, the loss is limited, because the potential difference is very small. When the switch is in off state, almost no loss occurs, because almost no current passes through the switch.

On the other hand, when a state of the switch transiently changes from on state to off state or from off state to on state, any of the current and the potential difference does not become zero, and thus a loss occurs in the switch. This loss is called a switching loss. A switching loss occurs each time switching is performed. Accordingly, an increase in the switching frequency increases the number of times of switching per unit time, thereby increasing the total switching losses. The power conversion device 10A of the reference example, which increases the frequency of PWM signals in order to reduce the noise peak, disadvantageously increases switching loss so as to reduce the power conversion efficiency.

In view of the foregoing, the present disclosure provides a power conversion device that can reduce the noise peak, as well as prevent an increase in switching loss.

Overview of Embodiments

A power conversion device according to an aspect of the present disclosure includes: a rectifier circuit that rectifies and smoothes an alternating-current voltage received from an alternating-current power supply and outputs a pulsating direct-current voltage; an input detection circuit that detects a state of the alternating-current voltage or an alternating current received from the alternating-current power supply; an inverter circuit that converts the direct-current voltage outputted from the rectifier circuit into an alternating-current voltage using a switch; a pulse generation circuit that generates a pulse signal for controlling the switch; and a frequency determination circuit that detects a conduction period in which switching noise generated by the switch is propagated to the alternating-current power supply, on the basis of the state detected by the input detection circuit and changes a frequency of the pulse signal at least in the conduction period.

According to this configuration, a noise peak can be reduced by spread-spectrum at least in the conduction period, in which switching noise is propagated to the alternating-current power supply. This method may not require to add a filter and/or external circuit for reducing the noise peak. For example, in the non-conduction period, the frequency of the pulse signal may be kept constant, or may be changed in a lower frequency band than the frequency band of the pulse signal in the conduction period. Thus, it is possible to prevent an increase in switching loss and to increase the power conversion efficiency.

In this aspect, the input detection circuit may detect, as the state, a voltage value of the alternating-current voltage received from the alternating-current power supply and may output the detected voltage value as an input voltage detection signal to the frequency determination circuit.

According to this configuration, the frequency determination circuit can detect the conduction period using the alternating-current voltage.

In this aspect, the input detection circuit may detect, as the state, a current value of the alternating current received from the alternating-current power supply and may output the detected current value as an input current detection signal to the frequency determination circuit.

According to this configuration, the frequency determination circuit can detect the conduction period using the alternating current.

In this aspect, the rectifier circuit may include a direct-current voltage detector that detects the pulsating direct-current voltage and outputs the detected direct-current voltage as a direct-current voltage detection signal to the frequency determination circuit.

According to this configuration, the frequency determination circuit can detect the conduction period using the direct-current voltage.

In this aspect, the input detection circuit may detect, as the state, a voltage value of the alternating-current voltage received from the alternating-current power supply and may output the detected voltage value as an input voltage detection signal to the frequency determination circuit; the frequency determination circuit may calculate an absolute value of the alternating-current voltage received from the alternating-current power supply using the input voltage detection signal; the frequency determination circuit may calculate the pulsating direct-current voltage using the direct-current voltage detection signal; when the calculated absolute value of the alternating-current voltage is larger than the calculated direct-current voltage, the frequency determination circuit may determine the frequency of the pulse signal as a frequency which varies with time in a range from a first frequency to a second frequency which is higher than the first frequency; when the calculated absolute value of the alternating-current voltage is equal to or smaller than the calculated direct-current voltage, the frequency determination circuit may determine the frequency of the pulse signal as a frequency which varies with time in a range from a third frequency to a fourth frequency which is higher than the third frequency or as the fourth frequency; and the second frequency may be higher than the fourth frequency.

According to this configuration, a noise peak can be reduced with the spread spectrum in the conduction period, in which the absolute value of the alternating-current voltage received from the alternating-current power supply becomes larger than the direct-current voltage rectified and smoothed by the rectifier circuit.

In addition, an increase in switching loss can be prevented in the non-conduction period, in which the absolute value of the alternating-current voltage received from the alternating-current power supply is equal to or smaller than the direct-current voltage rectified and smoothed, the switch is driven at a lower frequency than the second frequency. If the frequency in the non-conduction period is changed in a range from the third frequency to the fourth frequency, the noise peak in the non-conduction period can also be reduced.

In this aspect, the frequency determination circuit may calculate an absolute value of the alternating current received from the alternating-current power supply using the input current detection signal; the frequency determination circuit may determine the conduction period, in accordance with the calculated absolute value of the alternating current, may, in the conduction period, determine the frequency of the pulse signal as a frequency which varies with time in a range from a first frequency to a second frequency which is higher than the first frequency, and may, in the non-conduction period, determine the frequency of the pulse signal as a frequency which varies with time in a range from a third frequency to a fourth frequency which is higher than the third frequency or as the fourth frequency; and the second frequency may be higher than the fourth frequency.

According to this configuration, it is possible to determine the conduction period on the basis of the absolute value of the alternating current and to reduce the noise peak in the conduction period. On the other hand, in the non-conduction period, the switch is driven at a lower frequency than the second frequency and thus an increase in switching loss can be prevented. If the frequency in the non-conduction period is changed in a range from the third frequency to the fourth frequency, the noise peak in the non-conduction period can also be reduced.

In this aspect, the input detection circuit may detect, as the state, a voltage value of the alternating-current voltage received from the alternating-current power supply and may output the detected voltage value as an input voltage detection signal to the frequency determination circuit, the frequency determination circuit may calculate a phase of the alternating-current voltage received from the alternating-current power supply using the input voltage detection signal, the frequency determination circuit may determine the conduction period in accordance with the calculated phase of the alternating-current voltage, in the conduction period, the frequency determination circuit may determine the frequency of the pulse signal as a frequency which varies with time in a range from a first frequency to a second frequency which is higher than the first frequency, in the non-conduction period, the frequency determination circuit may determine the frequency of the pulse signal as a frequency which varies with time in a range from a third frequency to a fourth frequency which is higher than the third frequency or as the fourth frequency, and the second frequency may be higher than the fourth frequency.

According to this configuration, it is possible to determine the conduction period on the basis of the phase of the alternating-current voltage and to reduce the noise peak in the conduction period. On the other hand, in the non-conduction period, the switch is driven at a lower frequency than the second frequency and thus an increase in switching loss can be prevented. If the frequency in the non-conduction period is changed in a range from the third frequency to the fourth frequency, the noise peak in the non-conduction period can also be reduced.

Embodiments of the present disclosure will be described with reference to the drawings. Elements, the positions and connection forms of the elements, processes, the order of the processes, numbers, materials, voltage waveforms, and, characteristics described in the present disclosure are only illustrative. Of the elements described in the present disclosure, elements which are not described in the independent claims are described as optional elements.

Embodiment

Figure 1:
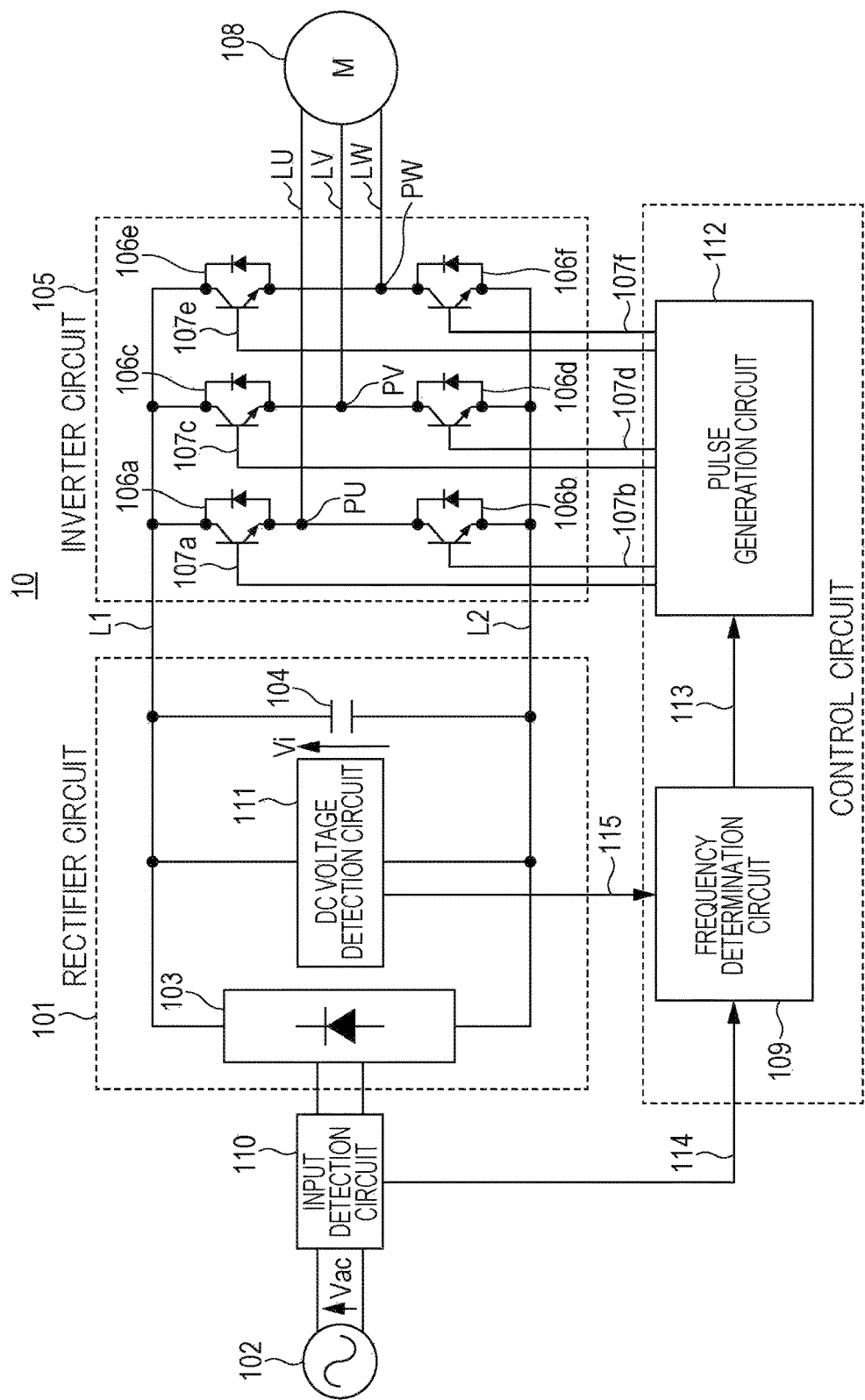
FIG. 1 is a circuit diagram of a power conversion device according to an embodiment.

FIG. 1 is a circuit diagram of a power conversion device 10 of an embodiment of the present disclosure. The power conversion device 10 includes a rectifier circuit 101, an inverter circuit 105 connected between the rectifier circuit 101 and a motor 108, an input detection circuit 110 connected between a commercial AC power supply 102 and the rectifier circuit 101, a frequency determination circuit 109, and a pulse generation circuit 112.

The commercial AC power supply 102 is an example of the "alternating-current power supply" of the present disclosure. The input detection circuit 110 is an example of the "first detection circuit" of the present disclosure. The frequency determination circuit 109 and pulse generation circuit 112 are an example of the "control circuit" of the present disclosure.

The commercial AC power supply 102 inputs an AC voltage Vac to the power conversion device 10. For example, the AC voltage Vac is an AC voltage supplied by a power company and having a frequency of 50 or 60 Hz and an rms value of 100 or 200 V. However, such an AC voltage is only illustrative, and the AC voltage Vac may be an AC voltage having a frequency and amplitude corresponding to an AC voltage supplied by a power company in the country or location in which the power conversion device 10 is used. While a single-phase AC voltage is used as the AC voltage Vac in the example shown in FIG. 1, a three-phase AC voltage may be used.

The rectifier circuit 101 includes a diode bridge 103 and a smoothing capacitor 104 and converts the AC voltage Vac into a pulsating DC voltage. Hereafter, a pulsating DC voltage will be referred to as a "DC voltage Vi."

The diode bridge 103 consists of, for example, full-bridge-connected multiple diodes and rectifies the AC voltage Vac. The smoothing capacitor 104 is connected to the diode bridge 103 in parallel and smoothes the AC voltage Vac rectified by the diode bridge 103 into a DC voltage Vi. The diode bridge 103 may consist of half-bridge-connected multiple diodes.

The inverter circuit 105 is connected to the smoothing capacitor 104 in parallel and consists of a three-phase inverter including six switches, 106a to 106f. The switches 106a, 106c, and 106e have collectors connected to a first line L1 and constitute an upper arm of the inverter circuit 105.

The switches 106b, 106d, and 106f have emitters connected to a second line L2 and constitute a lower arm of the inverter circuit 105.

The emitter of the switch 106a and the collector of the switch 106b are connected to a U-phase line LU through a junction PU. The switches 106a and 106b constitute a U-phase switch.

The emitter of the switch 106c and the collector of the switch 106d are connected to a V-phase line LV through a junction PV. The switches 106c and 106d constitute a V-phase switch.

The emitter of the switch 106e and the collector of the switch 106f are connected to a W-phase line LW through a junction PW. The switches 106e and 106f constitute a W-phase switch.

The U-phase line LU supplies, to the motor 108, a U-phase drive signal generated by switching operations of the switches 106a and 106b. The V-phase line LV supplies, to the motor 108, a V-phase drive signal generated by switching operations of the switches 106c and 106d. The W-phase line LW supplies, to the motor 108, a W-phase drive signal generated by switching operations of the switches 106e and 106f.

The switches 106a to 106f are turned on and off according to switching control signals 107a to 107f, respectively, generated by the pulse generation circuit 112. Thus, the switches 106a to 106f make changes to the U-phase, V-phase, and W-phase drive signals supplied to the motor 108.

Flywheel diodes are respectively connected between the collectors and emitters of the switches 106a to 106f. Thus, the switches 106a to 106f serve as bi-directional switches.

Examples of the switches 106a to 106f include transistors, such as insulated gate bipolar transistors (IGBTs), metal oxide semiconductor field-effect transistors (MOSFETs), and bipolar transistors.

Although the motor 108 is used as a load in the example shown in FIG. 1, the motor 108 is only illustrative, and other loads may be used.

The pulse generation circuit 112 generates switching control signals 107a to 107f to control the switches 106a to 106f. The switching control signals 107a to 107f are an example of pulse signals. The switching control signals 107a to 107f are, for example, pulse-width modulation (PWM) signals. The pulse generation circuit 112 sets the frequency of the switches 106a to 106f to a frequency specified by a frequency signal 113 received from the frequency determination circuit 109. The pulse generation circuit 112 includes, for example, a pulse generator.

Specifically, first, the pulse generation circuit 112 sets the frequency of a carrier signal to the frequency specified by the frequency signal 113 and then generates a PWM signal by comparing a modulation wave signal and the carrier signal. The carrier signal is, for example, a triangular wave signal. The modulation wave signal is, for example, a sinusoidal signal having a frequency and amplitude for rotating the motor 108 at the target speed.

The pulse generation circuit 112 then generates switching control signals 107a to 107f using the generated PWM signal. For example, the pulse generation circuit 112 generates the PWM signal as a U-phase, upper-arm switching control signal 107a as it is and generates a signal obtained by inverting the switching control signal 107a, as a U-phase, lower-arm switching control signal 107b.

The pulse generation circuit 112 also generates a signal 120 degrees out of phase with the switching control signal 107a, as a V-phase, upper-arm switching control signal 107c and generates a signal obtained by inverting the switching control signal 107c, as a V-phase, lower-arm switching control signal 107d.

The pulse generation circuit 112 also generates a signal 120 degrees out of phase with the switching control signal 107c, as a W-phase, upper-arm switching control signal 107e and generates a signal obtained by inverting the switching control signal 107e, as a W-phase, lower-arm switching control signal 107f.

The input detection circuit 110 divides the AC voltage Vac, for example, using a dividing resistor and outputs the divided AC voltage as an input voltage detection signal 114 to the frequency determination circuit 109. The divided AC voltage contains information about the voltage value of the AC voltage Vac. The divided voltage value obtained using the dividing resistor may be set to a value such that the dynamic range of the input voltage detection signal 114 falls within the input range of the frequency determination circuit 109.

The rectifier circuit 101 further includes a DC voltage detection circuit 111. The DC voltage detection circuit 111 divides the DC voltage Vi, for example, using a dividing resistor and outputs the divided DC voltage as a DC voltage detection signal 115 to the frequency determination circuit 109. The divided voltage value obtained using the dividing resistor may be set to a value such that the dynamic range of the DC voltage detection signal 115 falls within the input range of the frequency determination circuit 109.

The frequency determination circuit 109 calculates the absolute value of the AC voltage Vac using the received input voltage detection signal 114 and calculates the DC voltage Vi using the received DC voltage detection signal 115. As used herein, the absolute value of the AC voltage Vac refers to the absolute value of the instantaneous value of the AC voltage Vac, and the DC voltage Vi refers to the instantaneous value of the DC voltage.

The frequency determination circuit 109 then compares the absolute value of the AC voltage Vac and the DC voltage Vi. The frequency determination circuit 109 may make this comparison, for example, using a comparator.

First, a case will be described in which the absolute value of the AC voltage Vac is larger than the DC voltage Vi. In this case, switching noise generated in the inverter circuit 105 can be propagated to the commercial AC power supply 102 through the diode bridge 103. The period in which the absolute value of the AC voltage Vac is larger than the DC voltage Vi is an example of the "conduction period" of the present disclosure.

In this case, the frequency determination circuit 109 outputs, to the pulse generation circuit 112, a frequency signal 113 for changing the frequency of the switching control signals 107a to 107f in a range of A (Hz) to B (Hz). Thus, the power conversion device 10 can disperse the frequency of the switching noise due to the switching control signals 107a to 107f and thereby reduce the noise peak.

The frequency determination circuit 109 may changes the frequency signal 113 so that the frequency of the switching control signals 107a to 107f changes within a range of A (Hz) to B (Hz) each time a predetermined time elapses. For example, a cycle in which the frequency is gradually increased from A (Hz) to B (Hz) may be repeated, or a cycle in which the frequency is gradually reduced from B (Hz) to A (Hz) may be repeated.

The frequency determination circuit 109 may change the frequency, for example, by sequentially selecting one of N number of frequencies including B (Hz) as the maximum value and A (Hz) as the minimum value. For example, N may be three or more or may be 10 or more.

If the cycle in which the frequency is changed from A (Hz) to B (Hz) is shorter than the conduction period, the frequency spectrum can be sufficiently dispersed in the conduction period. For this reason, a conduction period within which the frequency can be changed from A (Hz) to B (Hz) may be previously calculated.

Next, a case will be described in which the absolute value of the AC voltage Vac is equal to or smaller than the DC voltage Vi. In this case, the diode bridge 103 does not conduct the power, but rather power discharged from the smoothing capacitor 104 is supplied to the inverter circuit 105. Thus, the commercial AC power supply 102 and inverter circuit 105 are electrically disconnected from each other, therefore preventing the propagation of switching noise to the commercial AC power supply 102 through the rectifier circuit 101. The period in which the absolute value of the AC voltage Vac is equal to or smaller than the DC voltage Vi is an example of the "non-conduction period" of the present disclosure.

In this case, the frequency determination circuit 109 outputs a frequency signal 113 for changing the frequency of the switching control signals 107a to 107f in a range of C (Hz) to D (Hz). Thus, the power conversion device 10 can disperse the switching noise frequency of the switching control signals 107a to 107f and thereby reduce the noise peak.

The method for changing the frequency of the switching control signals 107a to 107f in a range of C (Hz) to D (Hz) may be the same as the method for changing the frequency of the switching control signals 107a to 107f in a range of A (Hz) to B (Hz).

For example, the frequency determination circuit 109 may change the frequency by sequentially selecting one of M number of frequencies including D (Hz) as the maximum value and C (Hz) as the minimum value. M may be, for example, three or more or 10 or more.

The frequencies A (Hz) to D (Hz) satisfy the following relationships:

$A<B$;
$C \leq D$; and
$B>D$.

The maximum spread spectrum frequency D (Hz) in the non-conduction period is lower than the maximum spread spectrum frequency B (Hz) in the conduction period. Thus, the power conversion device 10 can reduce the number of times of switching per unit time in the non-conduction period and can prevent an increase in switching loss.

Figure 2A:
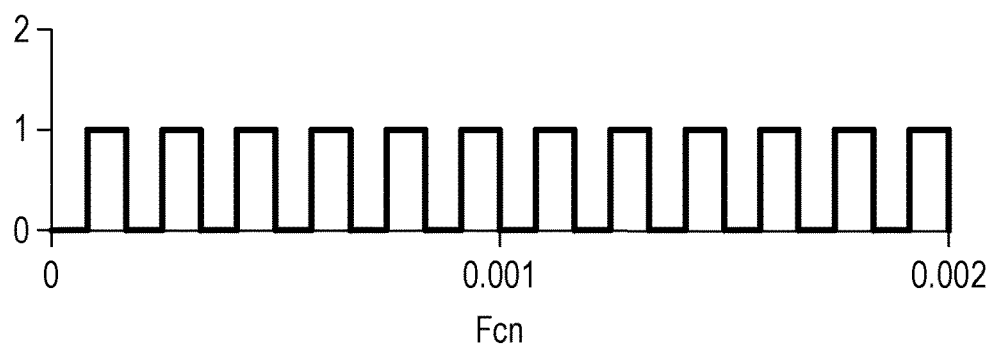
FIG. 2A is a diagram showing an example of the waveform of a PWM signal having a constant frequency.
Figure 2B:
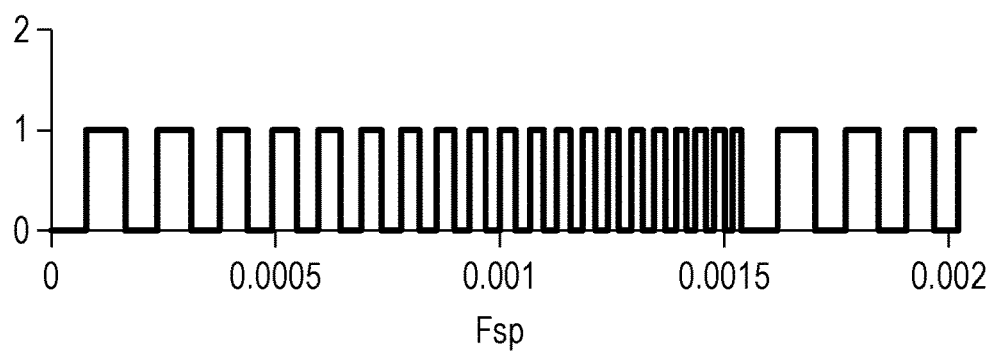
FIG. 2B is a diagram showing an example of the waveform of a spread-spectrum PWM signal.

FIG. 2A shows an example of the waveform of a PWM signal having a constant frequency, and FIG. 2B shows an example of the waveform of a spread-spectrum PWM signal. In FIGS. 2A and 2B, the vertical axis represents a standardized voltage [a.u.], and the horizontal axis represents the time [sec]. In the example shown in FIG. 2A, a waveform Fcn has a constant frequency of 6 kHz. In the example shown in FIG. 2B, a waveform Fsp has a frequency that varies by 1 kHz per pulse in a range of 6 kHz to 25 kHz.

Figure 3A:
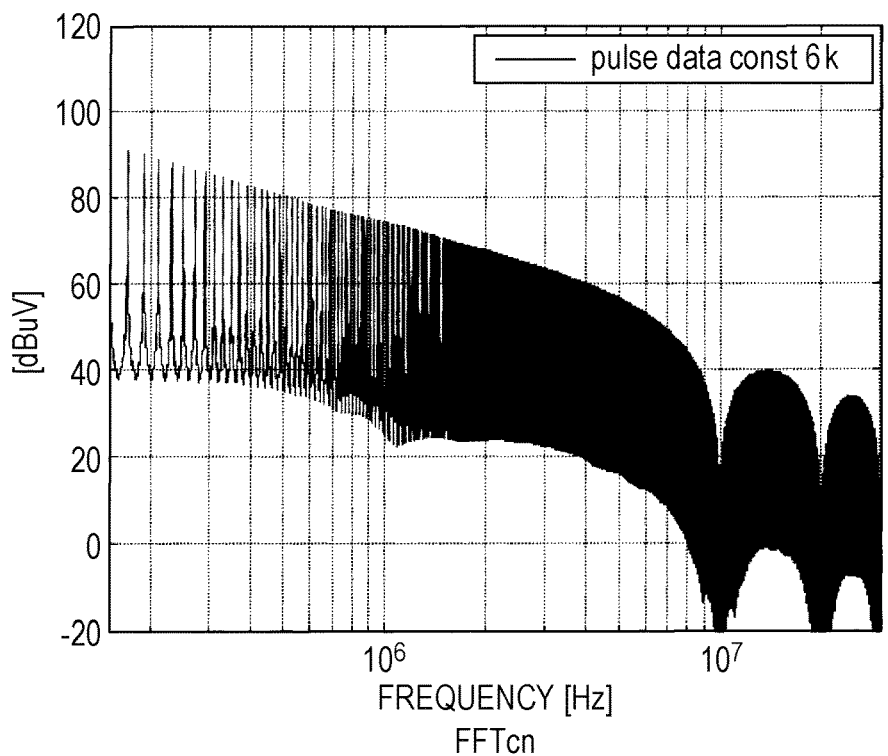
FIG. 3A is a diagram showing a waveform obtained by Fourier transforming the waveform shown in FIG. 2A.
Figure 3B:
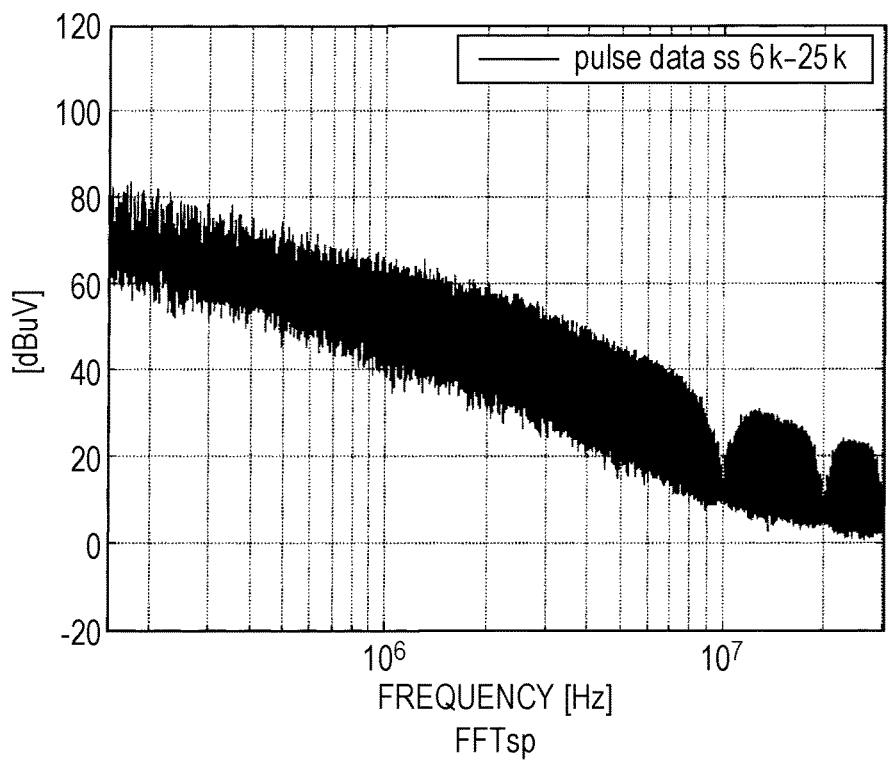
FIG. 3B is a diagram showing a waveform obtained by Fourier transforming the waveform shown in FIG. 2B.

FIG. 3A shows a waveform FFTcn obtained by Fourier transforming the waveform Fcn shown in FIG. 2A. FIG. 3B shows a waveform FFTsp obtained by Fourier transforming the waveform Fsp shown in FIG. 2B. In FIGS. 3A and 3B, the vertical axis represents the voltage [dBμV], and the horizontal axis represents the frequency [Hz] logarithmically.

As shown in FIGS. 3A and 3B, the voltage of the waveform FFTsp, as a whole, is lower than that of the waveform FFTcn by about 10 dB. Thus, a noise reduction effect owing to spread spectrum can be identified.

If the frequency of the AC voltage Vac is 60 Hz, one cycle is 16.7 msec. The voltage of the waveform Fcn is switched 200 times in a cycle of 16.7 msec. On the other hand, the voltage of the waveform Fsp is switched 435 times in a cycle of 16.7 msec. That is, in the case of the spread-spectrum PWM signal, switching loss is larger by about 2.2 times than that of the non-spread-spectrum PWM signal.

Accordingly, by setting the maximum spread-spectrum frequency in the non-conduction period to a frequency lower than the maximum spread-spectrum frequency in the conduction period, the number of times the switch makes a transition between on state and off state can be reduced. Thus, an increase in switching loss can be prevented.

For example, the frequency of the PWM signal in the non-conduction period may be fixed to a lower constant value (e.g., 6 kHz) than the maximum spread-spectrum frequency in the conduction period.

For example, assume that the frequency of the commercial AC power supply 102 is 60 Hz; and the frequency of the PWM signal is spectrum-spread in a range of 6 to 25 kHz in a one-fourth cycle of the AC voltage Vac and is fixed to 6 kHz in the remaining three-fourth cycle. In this case, the number of times the switch makes a transition between on state and off state in one cycle of the AC voltage Vac is reduced to 259 times. That is, the number of times the switch makes a state transition is reduced to 47% of that when spread spectrum is performed over the entire period, and the switching loss is reduced by 47%. Further, by performing spread spectrum in the conduction period of the diode bridge 103, the switching loss can be reduced while maintaining a 10-dB noise reduction effect.

The following modifications can be made to the power conversion device 10.

(1) While, in the above description, the frequency determination circuit 109 determines whether the rectifier circuit 101 is in the conductive state by comparing the absolute value of the AC voltage Vac and the DC voltage Vi, this determination may be made otherwise in the present disclosure. For example, the frequency determination circuit 109 may determine, on the basis of the phase of the AC voltage Vac calculated using the input voltage detection signal 114, whether the rectifier circuit 101 is in the conductive state, in which the rectifier circuit 101 allows the switching noise to propagate to the commercial AC power supply 102. In this case, the frequency determination circuit 109 may previously store a phase range corresponding to the conduction period and, if the calculated phase falls within the phase range corresponding to the conduction period, it may determine the conduction period. Note that the frequency determination circuit 109 may determine the conduction period on the basis of the phase of the alternating current calculated using the input current detection signal.

(2) The frequency determination circuit 109 may determine the conduction period on the basis of the absolute value of the alternating current received from the commercial AC power supply 102. For example, the input detection circuit 110 detects the alternating current received from the commercial AC power supply 102 and outputs the detected alternating current as an input current detection signal to the frequency determination circuit 109; the frequency determination circuit 109 calculates the absolute value of the alternating current using the input current detection signal; and if the calculated absolute value of the alternating current falls within a predetermined range, the frequency determination circuit 109 determines the conduction period. In this case, for example, the frequency determination circuit 109 previously stores an absolute value range of the alternating current corresponding to the conduction period and, if the calculated absolute value of the alternating current falls within the absolute value range of the alternating current corresponding to the conduction period, the frequency determination circuit 109 determines the conduction period.

(3) The frequency determination circuit 109 may determine the conduction period using only the absolute value of the AC voltage Vac without using the DC voltage Vi. For example, if the calculated absolute value of the AC voltage Vac falls within a predetermined range, the frequency determination circuit 109 determines the conduction period. In this case, for example, the frequency determination circuit 109 previously stores an absolute value range of the AC voltage Vac corresponding to the conduction period, if the calculated absolute value of the AC voltage Vac falls within the absolute value range of the alternating current corresponding to the conduction period, the frequency determination circuit 109 determines the conduction period.

(4) The frequency determination circuit 109 may or may not change the frequency of the switching control signals 107a to 107f in the non-conduction period. If the frequency is changed in the non-conduction period, the frequency determination circuit 109 sets the maximum frequency in the non-conduction period to a lower frequency than the maximum frequency in the conduction period. On the other hand, if the frequency is not changed in the non-conduction period, the frequency determination circuit 109 keeps the frequency of the switching control signals 107a to 107f constant in the non-conduction period. In this case, the constant frequency may be a smaller value than the maximum frequency in the conduction period and therefore may be higher or lower than the minimum frequency in the conduction period.

(5) While, in the example shown in FIG. 1, the rectifier circuit 101 includes the diode bridge 103, the present disclosure is not limited to this configuration. For example, instead of the diode bridge 103, the rectifier circuit 101 may include a synchronous rectifier circuit consisting of switches, such as MOS transistors.

(6) In the description of the above embodiment, assuming that the forward voltage of the diodes forming the diode bridge 103 is negligibly small, when the absolute value of the AC voltage Vac is larger than the DC voltage Vi, the diode bridge 103 conducts the power.

However, precisely, when the absolute value of the AC voltage Vac is larger than the sum of the DC voltage Vi and the forward voltage of the diodes, the diode bridge 103 conducts the power. Accordingly, when the absolute value of the AC voltage Vac is larger than the sum, the power conversion device 10 determines the conduction period; when the absolute value of the AC voltage Vac is equal to or smaller than the sum, it determines the non-conduction period.

(7) While, in the example shown in FIG. 1, the frequency determination circuit 109 and pulse generation circuit 112 are shown as different function blocks, these circuits may be circuit elements in a single control IC. At least one of the function blocks may be implemented by a semiconductor device, a semiconductor integrated circuit (IC), large scale integration (LSI), or an electronic circuit which is a combination thereof. The LSI or IC may be packed on a single chip or may be formed by combining multiple chips. The control circuit includes, for example, a processor and a memory. The processor is, for example, a central processing unit (CPU) or micro-processing unit (MPU).

(8) For example, the processor in the control circuit reads and executes a program stored in the memory. Thus, power conversion is performed in the inverter circuit.

Figure 5:
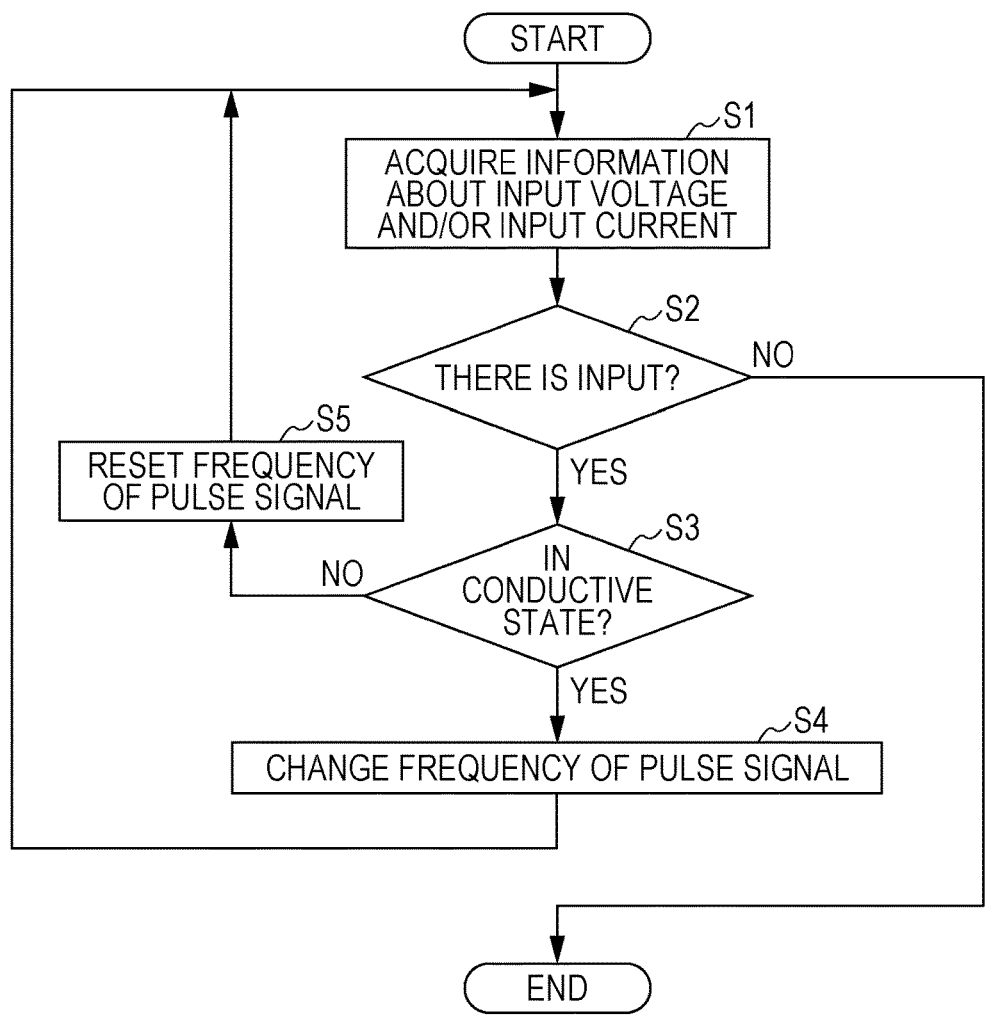
FIG. 5 is a flowchart showing an example of a power conversion method of the embodiment.

FIG. 5 is a flowchart showing an example of a power conversion method of the present embodiment.

The power conversion method is performed, for example, by the power conversion device 10 shown in FIG. 1.

At the start time point of operation as shown in FIG. 1, the power conversion device 10 is receiving the alternating current from the commercial AC power supply 102, and the switches 106a to 106f in the inverter circuit 105 are being controlled by pulse signals having an initial frequency.

In step S1, the input detection circuit 110 acquires information about the AC voltage and/or alternating current received from the commercial AC power supply 102.

If there is an input from the commercial AC power supply 102 (Yes in step S2), the operation proceeds to step S3; if there is no input (No in step S2), the operation is ended. Note that the operation need not necessarily include step S2. Instead of step S2, the operation may include a step for exiting the infinite loop. For example, the operation may be ended in accordance with an end signal inputted to the control circuit.

In step S3, the control circuit determines whether the rectifier circuit 101 is in a state in which the rectifier circuit 101 can pass switching noise from the inverter circuit 105 to the commercial AC power supply 102 (that is, in the conductive state), on the basis of information received from the input detection circuit 110. This determination is made, for example, by comparing the input voltage and/or current of the rectifier circuit 101 and the output voltage and/or current thereof.

If the rectifier circuit 101 is in the switching-noise conductive state (Yes in step S3), the operation proceeds to step 4.

In step S4, the control circuit changes the frequency of the pulse signals at a predetermined timing. For example, step 4 may include: determining whether the frequency of the pulse signals has reached a predetermined upper limit; if the frequency of the pulse signals has not reached the upper limit, increasing the frequency of the pulse signals; and if the frequency of the pulse signals has reached the upper limit, changing the frequency of the pulse signals to a predetermined lower limit (e.g., the initial frequency). After step S4, the operation returns to step S1. The predetermined timing may be, for example, the point in time when a predetermined time has elapsed after the previous frequency change.

Each time the frequency is changed in step S4, the operation may return to step S1 so that input voltage and/or input current is acquired again. In this case, the loop from step S1 to step S4 is repeatedly performed, and the frequency of the pulse signals is changed with time. Or, after the frequency is sequentially changed from the lower limit to the upper limit in step S4, the operation may return to step S1 so that input voltage and/or input current is acquired again. In this case, in step S4, the frequency of the pulse signals is changed with time. Note that the frequency and timing at which the information about the input voltage and/or input current is acquired in step S1 are not limited to those described above. The term "the period in which the rectifier circuit is in the conductive state" refers to, for example, a continuous period from when it is determined to be in the conductive state to immediately before it is determined not to be in the conductive state. The frequency of the pulse signals may be sequentially reduced, or may be selected randomly or sequentially.

If the rectifier circuit 101 is not in the switching noise conductive state (No in step S3), the operation proceeds to step 5. In step S5, for example, the frequency of the pulse signals may be reset to the initial frequency. Note that the operation need not necessarily include step S5. For example, instead of step S5, the frequency may be changed as in step 4. In this case, the upper limit of the frequency in step 5 is lower than the upper limit of the frequency in step 4.

According to the operation, spread spectrum is performed when the rectifier circuit is in the switching noise conductive state; the number of times of switching can be reduced when the rectifier circuit is in the non-switching noise conductive state.

The power conversion device according to the present disclosure can be used in a variety of devices that perform power conversion using switches, including motor drive units.

What is claimed is:

1. A power conversion device comprising:
   a first detection circuit that acquires input information about at least one of an input alternating-current voltage and an input alternating current which are inputted to the power conversion device from an alternating-current power supply;
   a rectifier circuit that rectifies the input alternating-current voltage to output a pulsating direct-current voltage;
   an inverter circuit that converts the pulsating direct-current voltage into an alternating-current voltage, the inverter circuit including a switch; and
   a control circuit that generates a pulse signal for the switch while the control circuit (A) determines, based on the input information, whether the rectifier circuit is in a state in which the rectifier circuit allows switching noise to propagate from the switch to the alternating-current power supply and (B) changes a frequency of the pulse signal with time at least in a first period in which the rectifier circuit is in the state.

2. The power conversion device according to claim 1, wherein
   a maximum value of the frequency of the pulse signal in the first period is higher than a maximum value of the frequency of the pulse signal in a second period in which the rectifier circuit is not in the state.

3. The power conversion device according to claim 2, wherein
   the input information is information about a current value of the input alternating current, and
   the control circuit determines a period in which an absolute value of the current value of the input alternating current is larger than a predetermined value, as the first period, and determines a period in which the absolute value of the voltage value of the input alternating-current voltage is smaller than the predetermined value, as the second period.

4. The power conversion device according to claim 3, wherein the control circuit includes a comparator that compares the absolute value of the current value of the input alternating current and the predetermined value and a pulse generator that generates the pulse signal.

5. The power conversion device according to claim 2, wherein
the input information is information about a phase of the input alternating-current voltage, and
the control circuit determines a period in which the phase of the input alternating-current voltage falls within a predetermined range, as the first period, and determines a period in which the phase of the input alternating-current voltage falls out of the predetermined range, as the second period.

6. The power conversion device according to claim 5, wherein the control circuit includes a comparator that determines whether the phase of the input alternating-current voltage falls within the predetermined range, and a pulse generator that generates the pulse signal.

7. The power conversion device according to claim 2, wherein
the input information is information about a voltage value of the input alternating-current voltage, and
the control circuit determines a period in which an absolute value of the voltage value of the input alternating-current voltage is larger than a predetermined value, as the first period, and determines a period in which the absolute value of the voltage value of the input alternating-current voltage is smaller than the predetermined value, as the second period.

8. The power conversion device according to claim 7, wherein
the rectifier circuit includes a second detection circuit that acquires information about a voltage value of the pulsating direct-current voltage, and the predetermined value is the voltage value of the pulsating direct-current voltage.

9. The power conversion device according to claim 7, wherein the control circuit includes a comparator that compares the absolute value of the voltage value of the input alternating-current voltage and the predetermined value, and a pulse generator that generates the pulse signal.

10. The power conversion device according to claim 2, wherein the frequency of the pulse signal in the second period is constant with the time.

11. The power conversion device according to claim 1, wherein the input information is information about a voltage value of the input alternating-current voltage.

12. The power conversion device according to claim 1, wherein the input information is information about a current value of the input alternating current.

13. The power conversion device according to claim 1, wherein the input information is information about a phase of the input alternating-current voltage.

14. The power conversion device according to claim 1, wherein the control circuit changes the frequency of the pulse signal in the first period by sequentially selecting one of N number of different frequencies with time, where N is equal to or larger than 3.

15. The power conversion device according to claim 1, wherein
the pulse signal is a pulse-width modulation signal, and
the frequency is a fundamental frequency of the PWM signal.

* * * * *